United States Patent
Snyder et al.

(10) Patent No.: US 8,220,037 B2
(45) Date of Patent: Jul. 10, 2012

(54) CENTRALIZED BROWSER MANAGEMENT

(75) Inventors: Kevin Howard Snyder, Pacifica, CA (US); Chien-Ming Su, San Jose, CA (US); Samuelson Rehman, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1386 days.

(21) Appl. No.: 11/637,518

(22) Filed: Dec. 12, 2006

(65) Prior Publication Data

US 2008/0140820 A1    Jun. 12, 2008

(51) Int. Cl.
*H04L 9/00* (2006.01)
*G06F 15/16* (2006.01)
*G06F 17/00* (2006.01)
*G06F 15/173* (2006.01)

(52) U.S. Cl. .................. 726/7; 709/223; 726/1
(58) Field of Classification Search ............. 726/1
See application file for complete search history.

(56) References Cited

U.S. PATENT DOCUMENTS

| | | | |
|---|---|---|---|
| 7,580,996 B1 * | 8/2009 | Allan et al. | 709/224 |
| 2003/0018885 A1 * | 1/2003 | Landsman et al. | 713/2 |
| 2004/0015715 A1 * | 1/2004 | Brown | 713/200 |
| 2004/0267798 A1 * | 12/2004 | Chatterjee et al. | 707/102 |
| 2005/0268172 A1 * | 12/2005 | Uchinomiya et al. | 714/37 |
| 2006/0117063 A1 * | 6/2006 | Havewala et al. | 707/104.1 |
| 2006/0230433 A1 * | 10/2006 | Chang | 726/3 |
| 2007/0220599 A1 * | 9/2007 | Moen et al. | 726/12 |
| 2007/0266421 A1 * | 11/2007 | Vaidya et al. | 726/1 |
| 2007/0280105 A1 * | 12/2007 | Barkay et al. | 370/229 |

* cited by examiner

*Primary Examiner* — Nathan Flynn
*Assistant Examiner* — Trang Doan
(74) *Attorney, Agent, or Firm* — Shun Yao; Park, Vaughan, Fleming & Dowler LLP (57) ABSTRACT

A method and apparatus for centrally managing operation of browsers on client devices within an organization or other collection of users. A central server promulgates a central browser policy for application by agents executing on the client devices. The agents may operate in real-time as a browser executes (e.g., as browser extensions) and/or when the browser is inactive (e.g., as separate processes). The agents apply the central policy to block, remove or modify browser objects as required by the policy (e.g., to protect privacy), archive browser objects on the central server, create objects regulated by the organization (e.g., for browser pre-caching), etc. Because the policy is centrally customized but locally executed, it can be implemented on mobile devices even when those devices are remote from the organization.

19 Claims, 4 Drawing Sheets

CENTRALIZED BROWSER MANAGEMENT

BACKGROUND

This invention relates generally to the field of computer systems. More particularly, methods and apparatus are provided for centrally managing browser objects manipulated at local client devices.

Browsers have become commonplace tools for accessing enterprise applications and retrieving information. However, corporations and other organizations typically have little or no control over the operation of browsers by individual users within the organization and the manipulation of objects (e.g., temporary files, cookies, data) by those browsers.

Users may execute multiple browsers or even multiple types of browsers on their client devices (e.g., desktop or laptop computers, personal digital assistants, mobile telephones). Their browsers may be configured in some default fashion (i.e., as designed by the browser provider) or may have settings configured differently by various users and/or other entities, such as external applications. As a result, the organization has no control over how or whether the users' browsers behave, such as how or when they cache temporary files, create or delete cookies, archive downloaded objects, etc.

However, given that a vast amount of data is exchanged via browser applications, an organization may wish to have some central control over how its users' browsers are operated, possibly in light of privacy concerns, legal issues or concerns, business agreements, confidentiality, etc.

For example, the organization may have an interest in ensuring that some types of objects or data are archived (e.g., organizational data that may be proprietary), that some cookies are not stored permanently, that privacy data are expunged within a certain period of time, that users are encouraged to navigate to sites operated by partners of the organization rather than the partners' competitors, and so on.

SUMMARY

Therefore, in one embodiment of the invention, a method and apparatus are provided for centrally managing operation of browsers on client devices within an organization or other collection of users. A central server promulgates a central browser policy for application by agents executing on the client devices. The agents may operate in real-time as a browser executes (e.g., as browser extensions) and/or when the browser is inactive (e.g., as separate processes). The agents apply the central policy to remove, modify or block browser objects as required by the policy (e.g., to protect privacy), archive browser objects on the central server, create objects regulated by the organization (e.g., for browser pre-caching), etc. Because the policy is centrally customized but locally executed, it can be implemented on mobile devices even when those devices are remote from the organization.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk, CD, DVD) memory.

In one embodiment of the invention, a method, apparatus and computer-readable media are provided for centrally managing behavior of browsers within an organization (e.g., a corporation) or other group of users (e.g., a home network, a university). More specifically, a central policy is promulgated and applied to control objects manipulated by browsers operating on users' client computing devices that are capable of executing a browser (e.g., desktop computers, portable computers, personal digital assistants).

The central policy may apply to multiple types and/or versions of browsers, or separate central policies may be promulgated for different browser types and/or versions (e.g., Internet Explorer, FireFox, Mosaic). The policies may be applied in real-time (i.e., during browser execution) or non-real-time, by agents or agent modules that are installed as browser plug-ins or extensions to the browsers, or that operate as processes separate from the browsers.

Thus, in one embodiment of the invention, native agents run in conjunction with browser extensions to provide complete browser management. However, because some management functions may not be appropriate or feasible to achieve within the browser, while some may not be appropriate or feasible to achieve outside the browser, in other embodiments agents may be configured to operate differently. In yet other embodiments, agents may be configured to operate with a browser (e.g., as a plug-in or extension) for some tasks, and as a separate process for other tasks.

For example, installation or modification (e.g., upgrade) of a browser may be best performed by a process (e.g., agent) running separate from the browser, whereas installation or modification of a browser plug-in may be best performed by an agent operating as another plug-in or extension. As another example, downloading a central policy or other information (e.g., a deployment package) may be done differently depending on the amount of data being downloaded. If substantial, it may be best to perform the download in a process separate from the browser (instead of through a plug-in or extension) to avoid degrading its performance.

Regardless of whether they operate in real-time or non-real-time with a browser, agents can create, delete, modify, block or otherwise manipulate cookies, temporary files, data files, browser plug-ins and/or other objects. Agents may be configured to uniquely identify a client browser to an identity manager process operating on a central server.

Implementation of a central policy at local browsers described herein allows an organization to enforce privacy policies and address other concerns with minimal impact on the browsers' operation. Further, the local agents that implement a central policy may be configured to provide feedback (e.g., to a central server) or respond to polls regarding browser usage (e.g., sites navigated to, objects manipulated), object manipulation, client configuration, etc.

In one embodiment of the invention, users can create and customize local policies to be enforced at their local browsers via their local agents. However, those policies are only enforced to the extent they do not contradict any central policies that apply to the browsers. In particular, a central policy may supersede a local policy, but can only be created, deleted and/or modified at a central server, whereas local policies can only be created, deleted and/or modified locally.

Figure 1:
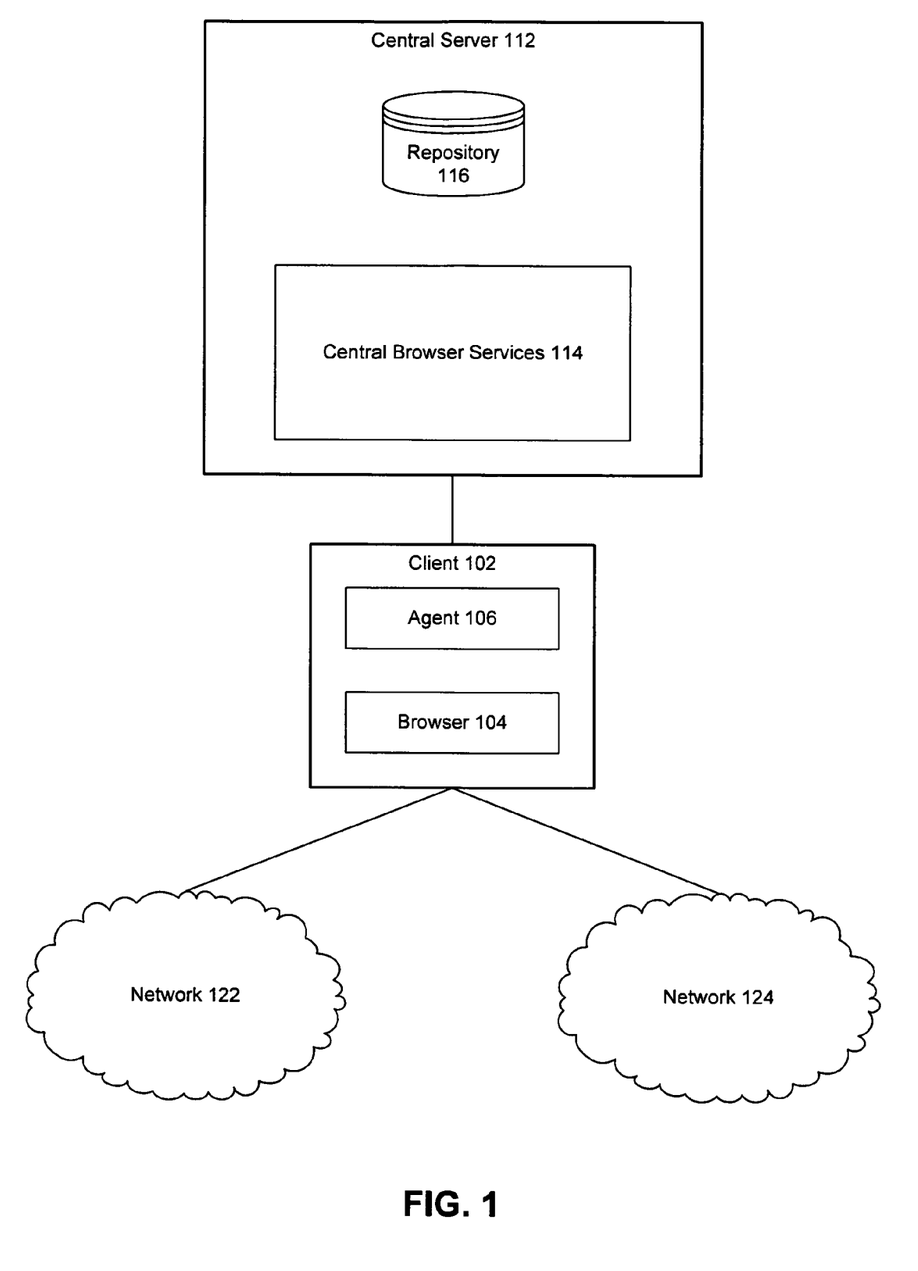
FIG. 1 depicts a computing environment in which with an embodiment of the present invention may be implemented.

FIG. 1 is a diagram of an illustrative computing environment in which an embodiment of the invention may be implemented. In FIG. 1, a user operates client device 102, which comprises browser 104 and agent 106 configured to implement a central browser policy. The agent may be part of, or coupled to, browser 104 (e.g., run as an extension or plug-in), and/or may be separate (e.g., run as a separate process). Client 102 is coupled to central server 112 via any suitable communication link, which may be dedicated (e.g., point-to-point) or shared (e.g., a network connection such as the Internet), wired or wireless, etc.

The user may browse trusted sites and/or untrusted sites, in various domains or networks. For example, network 122 may represent an intranet or workgroup of computing devices within the user's organization, and network 124 may represent the Internet or some other collection of computer systems outside the user's organization.

The user's organization controls operation of central server 112, which comprises central browser services 114 and repository 116. Central browser services may include a variety of functions, including disseminating central browser policies to clients, serving objects to be stored on clients (e.g., pre-cache browser objects, Enterprise selected browser plug-ins), receiving from clients objects to be archived, polling clients regarding browser and/or network usage, issuing alerts (e.g., to users, to a system administrator), interfacing with external applications or services, and so on.

Repository 116, which may comprise any number of storage devices, may store central browser policies, archived browser objects, usage statistics, objects and/or executable code to be transmitted to clients, etc.

In one implementation of the illustrated embodiment of the invention, central server 112 pushes a central browser policy to client 102 (or the client pulls the policy), and also sends to the client objects (e.g., cookies, pre-cache objects, browser plug-ins) that the policy requires be stored on the client. While browser 104 executes, and/or after it closes, agent 106 applies the central policy locally (i.e., on the client) to store the required objects, remove prohibited objects (e.g., specific cookies or temporary files), remove expired objects, block prohibited objects, archive specified objects (e.g., objects comprising organizational data), send usage statistics to the central server, etc.

A central browser policy may be provided in various forms to clients, for example in XML, text, HTML or other form. A policy may be relatively brief or quite lengthy, depending on the number and type of events and actions the policy administrator has addressed.

The following is an example of a central browser policy addressing multiple events: launch of a browser instance, termination of a browser instance and launch of a local agent process.

```
<BrowserObjectPolicy>
    <property browserType="FireFox"
url="http://www.microsoft.com" type="MaximumObjectSize"> 50000000
    </property>
    <event type="OnBrowserStartup">
        <action sequence=0 type="StartAgentProcess"></action>
        <action sequence=1 type="ReloadPolicy"></action>
    </event>
    <event type="OnBrowserExit">
        <action sequence=0 type="Delete">
            <ignoreurl>oracle.com</ignoreurl>
            <urlpattern>xyzzy.com</urlpattern>
            <temporaryfile>.xls</temporaryfile>
            <temporaryfile>.doc</temporaryfile>
            <temporaryfile>.ppt</temporaryfile>
            <temporaryfile>.jpg</temporaryfile>
        </action>
        <action sequence=1 type="Update">
            <cookie>oracle.com</cookie>
        </action>
    </event>
    <event type="OnAgent Startup">
        <action sequence=0 type="CheckForPolicyUpdate">
        </action>
        <action sequence=1 type="DownloadNewObjects">
        </action>
    </event>
</BrowserObjectPolicy>
```

In this example, the policy tells the client agent that it should monitor the specified events (i.e., BrowserStartup, BrowserExit, Agent Startup). Several "action-types" are illustrated, and are performed when their corresponding events are detected.

A first example event type specified in this illustrative central policy is a browser startup. When a browser startup is detected, the first specified action type (i.e., StartAgentProcess) indicates that a local agent should be started (if not already running). The second action type (i.e., ReloadPolicy) results in the local agent loading or reloading any local browser policies into memory, to make them available to the browser.

The second event type for the example central policy (i.e., BrowserExit), specifies that when a browser exit is detected, the action type "delete" should be implemented. This will cause the agent to delete objects meeting the following criteria: a URL that includes "xyzzy.com", and/or a file that ends with one of the indicated extensions. However, the agent should ignore (i.e., not delete) objects that have the "ignore URL" pattern. The second action type for this event (i.e., update), specifies that the agent should update the central server archive with cookies created by the indicated domain. In particular, this action type will spur the agent to send to the central server copies of matching cookies that have never been stored on the server, and copies of matching cookies whose timestamps are newer than any identical cookies already archived on the server.

Regarding the third enumerated event type (i.e., AgentStartup), two actions are implemented when the launch of a local agent is detected. The CheckForPolicyUpdate action initiates a check for new/updated browser policies on a central server; if any are found, they are retrieved and used to replace any corresponding preexisting policies. The DownloadObjects action prompts the downloading (from the central server) of any new or updated objects (e.g., pre-caches objects) that are tagged as being required for the client device (e.g., if they do not already exist).

A single central policy may span multiple files, and may specify any number of events, and an event may initiate any number of actions. Other illustrative events include (but are not limited to) OnDomainVisit, OnURLVisit, OnCustomExpiration, OnMaximumObjectSizeReached, OnAlertTrigger, OnServerUnavailable, OnServerAvailable, OnBrowserUpdate, OnPluginInstall, etc. Other illustrative action types include (but are not limited to) SetCustomExpiration, CheckForBookmarkUpdate, SetAlertMessage, SetAudit, SetUpdateSchedule, BlockInstall, AllowInstall, etc.

Figure 2:
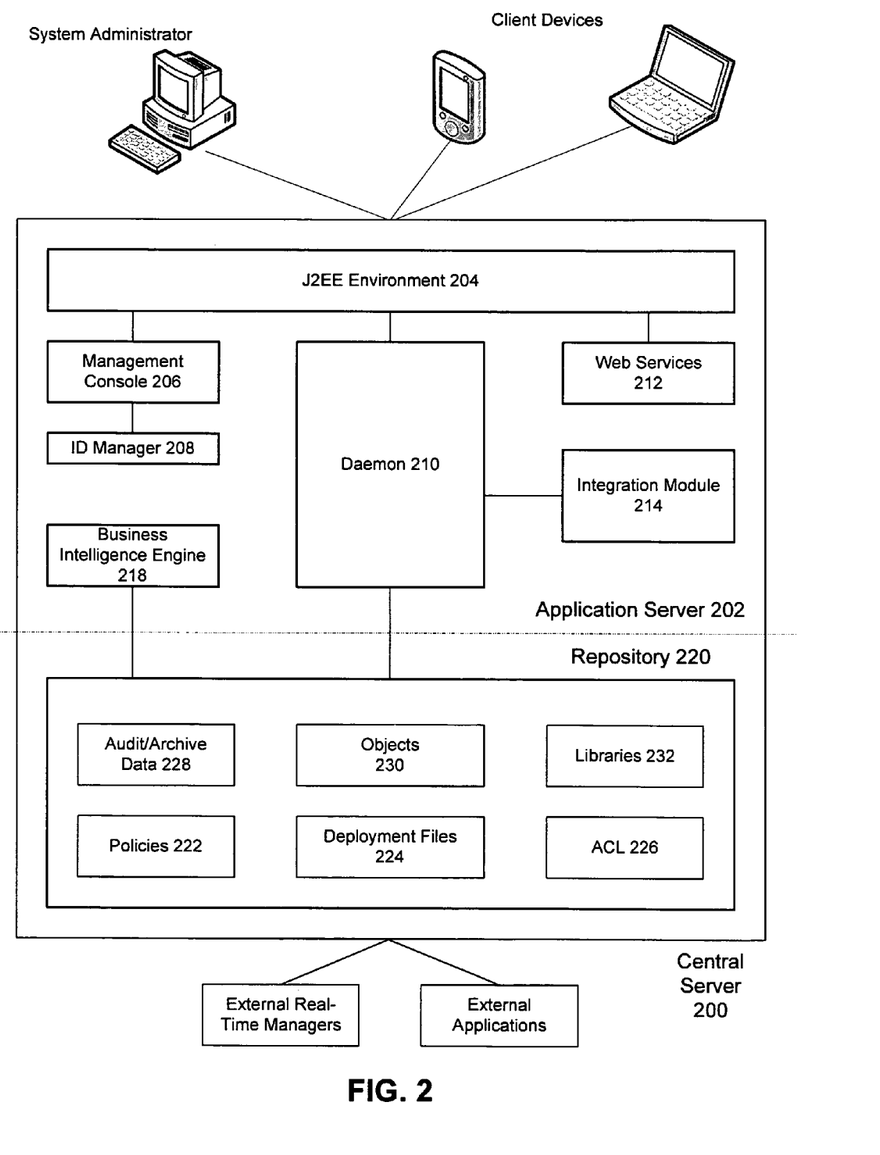
FIG. 2 depicts a server for centrally managing browser objects, in accordance with an embodiment of the invention.

FIG. 2 is a block diagram of a central server for configuring and issuing central browser policies, coordinating implementation of the policies, and collecting statistics, according to one embodiment of the invention. Any number of central servers may operate in parallel (e.g., as a cluster, as peers), or multiple computer systems may cooperate to act as a central server.

In this embodiment, central server 200 may be viewed as comprising two major components—an application server and a repository. Illustratively, repository 220 stores various types of data, while application server 202 interfaces with client agents, administrators and other external entities to provide and coordinate the central server's services.

In FIG. 2, application server 202 comprises a J2EE environment 204 or other runtime component (e.g., Oracle Containers for Java (OC4J) by Oracle Corporation), management console 206 and identity manager 208, a daemon or proxy 210, web services 212, integration module 214 and business intelligence engine 218. In other implementations, the application server may include additional or fewer elements, or functionality described herein may otherwise be distributed among a different combination of elements.

J2EE environment 204 is configured to receive connections from agents operating on client devices, for purposes of exchanging information with the central server, and also from system administrators, external applications and other entities designed to access central server services via an application server. For example, installation (e.g., deployment) requests from new client devices (i.e., devices that have no agent installed) are received via J2EE environment 204.

Management console 206 is used by a system administrator or manager to control operation of the central server, access statistics, configure a central browser policy, manipulate the contents of repository 220, control access to the central server, configure client installation (or deployment) packages, etc.

Identity manager 208 is employed by the management console to help uniquely identify every client device, operating system instance, browser instance and/or agent instance that communicates with central server 200 or that needs to be monitored. In particular, identity manager 208 manages identity data that is received from agents and that uniquely identifies client devices, operating system instances and client browser instances. This helps ensure that the appropriate central browser policies and client installation packages are applied to each client device.

Daemon 210 acts as an interface (e.g., a proxy, a passthrough) between client agents (and/or new client devices) and repository 220. In particular, during its operation, an agent connects to central server 200 via J2EE environment 204, and daemon 210 provides access to the repository to download information to the agent (e.g., policies, objects, executable code) and/or receive data from the agent (e.g., usage statistics, archived objects), and/or deploy new agents to fresh client devices. The daemon is configured to recognize each individual agent and/or browser, so that the appropriate access is granted to the central server and the appropriate data (e.g., policies, objects) are exchanged.

Web services 212 are configured to provide access to other applications or services, which may reside outside central server 200. For example, links may be provided to business partners, services such as anti-virus or other anti-malware tools, preferred partner services, etc. In this example, client agents can act as interfaces (e.g., proxies, passthroughs) for anti-virus signatures.

Integration module 214 provides additional or alternative means of coordinating operation of central server 200 with an external entity, such as an external application or a real-time manager. In one implementation, the integration module provides an interface to an external dashboard to provide a real-time view of the computing environment, which may show browser objects being created, blocked, deleted or otherwise manipulated, agents being installed, and so on. The integration module may also be configured to issue an alert if a particular event is detected, such as a low amount of storage space in the repository, navigation to a particular site by a user, an error signaled by an agent, etc.

Business intelligence engine 218 is configured to search data reported by agents for particular patterns or activity (e.g., browser navigation, network usage, bandwidth measurements).

Repository 220 of central server 200 stores central browser policies 222, deployment files 224, Access Control List (ACL) 226 or other security information, audit data 228, objects 230 and libraries 232.

As described previously, a central browser policy 222 may apply to multiple types of browsers, or separate policies may be provided for the different types. Repository 220 stores these central browser policies and transmits them to agents as needed. For example, when an agent is newly installed on a client device and the type(s) of browser executing on the client is/are identified, any number of policies may then be downloaded to the client for application by the agent. An agent may regularly query the central server for new/updated policies (e.g., every time it executes, on a predefined schedule).

Because a central browser policy is configurable by an organization, it can be customized to the organization's needs. For example, the organization may be very protective of users' privacy, and wish to safeguard browser objects that contain personal information. Or, the organization may wish to limit its users' access to particular websites or domains, ensure only browser plug-ins that it has approved are used, provide protection against malware on mobile devices even when disconnected from the organization's network, and so on. In contrast, traditional browsers do not allow an organization to customize or implement a central browser policy for all users.

Deployment files 224 may include policy files and agent installation packages for installation on clients, with different agent modules being installed on client devices depending on the client type (e.g., thin client, workstation), operating system, etc. Deployment files 224 may also include installation packages for browsers, browser plug-in and/or browser extensions, any of which may be customized for the organization.

ACL 226 comprises an access control list (or other security scheme) for controlling access to repository 220 (e.g., via daemon 210) and/or other components of the central server. Different clients, agents and administrators may have different levels of access.

For example, an administrator may be categorized within one or more administrator groups, such as Global, Policy and Statistics. In this example, a global administrator can view and modify all data and application tasks, a policy administrator can view and modify central policies, and a statistics administrator may be limited to accessing statistics regarding object creation and usage. Illustratively, only the highest level administrators (e.g., Global administrators) may be permitted access personally identifiable information (e.g., cookies containing privacy data).

Audit/archive data 228 comprises data files and/or other objects received from client devices for auditing purposes and/or for archiving. Illustratively, some or all persistent browser objects downloaded to a client from an organization server (e.g., other than central server 200) or other specific domain (e.g., a business partner, a competitor) during operation of a browser on the client may be archived on the central server. In one implementation, privacy information may be stripped from archived objects before they are stored. Further, statistics or histories of users' browsing may be stored for auditing (e.g., by business intelligence engine 218).

Objects 230 may include objects that a policy requires be stored on a client (e.g., a cookie, a pre-cache object). Such objects may facilitate access by users to the organization's computer systems and/or sites operated by business partners. These objects may thus be stored on clients before the clients' browsers are ever navigated to the corresponding sites or domains.

Libraries 232 may include various Dynamic Link Libraries (DLLs), applets or other executable code that may be installed on a client device, such as anti-virus software, an approved instant messenger, etc.

Figure 3:
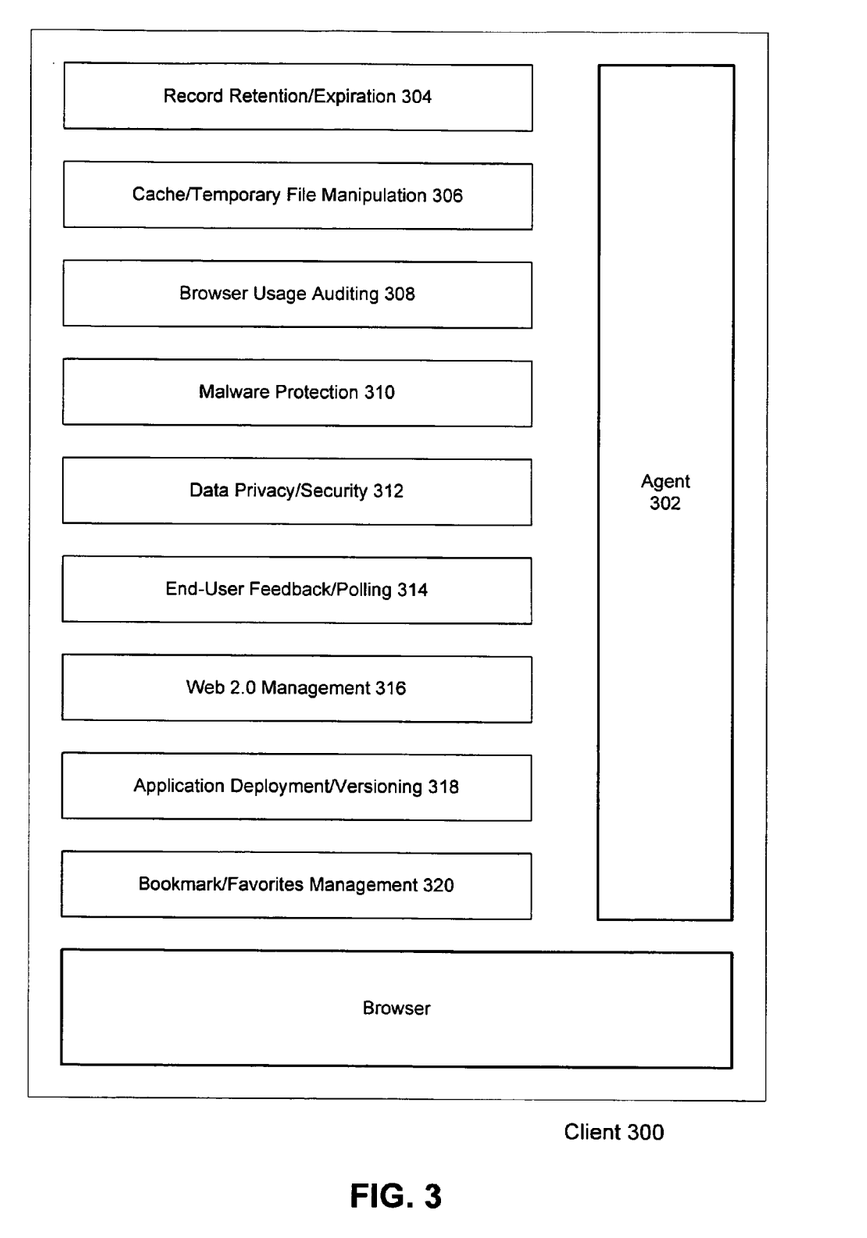
FIG. 3 depicts a client configured to manage browser objects as specified in a central policy, in accordance with an embodiment of the invention.

FIG. 3 is a block diagram depicting a client device configured to operate a central browser agent according to one embodiment of the invention. Some relevant components of a client (e.g., processor, storage, communication ports, display, input device) are omitted for the sake of clarity.

Client 300 has one or more browser instances installed, which may be of any type. A user operates client 300 and navigates the browser as needed to access information within and/or without the organization.

Agent 302 is installed (e.g., from a central server), and may be specific to the type of client device, operating system and/or other characteristic(s) of the client. In the illustrated embodiment of the invention, agent 302 is configured to run as a separate process from the browser. In other embodiments of the invention, however, the agent may be installed as an extension to, or as a part of, a browser.

When activated (e.g., as part of the client initialization), the agent may attempt to connect to a central server to check for new or updated central browsing policies, and may also check for new or updated objects regulated by the organization (e.g., pre-cache objects). If no new or updated policies are found, or if the agent cannot connect to a central server, it will apply the policy or policies previously received.

Because agent 302 is not configured as a browser extension, it may be configured to execute only when the browser is not active. Illustratively, the agent may monitor the client for activation of a browser process and suspend operation until after the browser terminates or becomes inactive. The agent may then scan the client's file system (e.g., especially locations used by the browser) to determine whether any provisions of its policies must be applied.

In one implementation, a browser's working directories or directory structure may be learned through the browser cache definition. In another implementation, a browser plug-in may communicate this information to a local agent that executes while the browser is active.

Various modules are installed as plug-ins to agent 302, to perform a variety of functions. Functionality of the modules may be merged, reduced, augmented or otherwise rearranged in other embodiments of the invention. For example, individual plug-ins may or may not be included in a client installation package, on a case-by-case basis.

Record retention/expiration 304 is responsible for retaining and/or expunging information (e.g., browser objects) according to the applicable central browser policies. Thus, if a browser stored an object based on some default browser setting, the agent may remove (e.g., delete, archive) the object if required by a policy. For example, a central browser policy may set limits on how long objects that contain private user information may be retained, and those limits may require deletion before the browser would normally expunge such objects. Or, the policy may specify that a client may not store any objects or data from a given website or domain (or may control the amount and/or size of stored objects or data). If the agent operates in real-time, record retention/expiration 304 may block creation of an object that would violate the policy.

Record retention/expiration 304 may also create, undelete or replace an object deleted or omitted by the browser. For example if the user's organization wishes to have a particular cookie or other object stored on the client (e.g., for use if/when the browser is navigated to a particular site or domain, or when a particular web service is accessed via the browser), the agent may store it on the client, or retrieve an archived copy of the object from the server and re-apply it to the file system and/or browser.

Further, record retention/expiration 304 may be responsible for archiving specified objects, from the client, on a central server or other location. For example, if a user's client device is being replaced, a local policy may be applied to archive the user's bookmarks and cookies to a central location, then restore them on the new device.

Cache/temporary file manipulation 306 caches objects, central browser policies, downloaded data and/or other information used by agent 306 during application of a central browser policy or other operation. Notably, pre-caching of objects may be supported by this agent plug-in.

Browser usage auditing 308 is configured to record information regarding usage of the browser. For example, based on the creation or manipulation of persistent browser objects, this module tracks where (e.g., websites, domains) the browser visited, and can relay that information to a central server. Browser usage auditing 308, or some other module, may issue a warning and/or suggestion to a user if the user attempts to navigate to a particular website or domain, or may prevent such navigation (e.g., and display a message indicating why). Illustratively, auditing may be used in conjunction with an external application (e.g., a financial application coupled to a central server) to support billing of web sites for local data storage.

Malware protection 310 is configured to protect client 300 from being infected with malware. This may entail blocking access to sites/domains specified in a central browser policy, executing an application to search received data for viruses, spam, adware and/or other undesired content, and so on. Operation of malware protection 310 may be suspended when or while the client device is protected in some other manner, such as when it is connected to the organization's network—if the network performs such protection at a gateway, firewall or other point. Thus, malware protection 310 may be particularly useful when the client is separated from the network and help allow a central browser policy to continue to be applied even when the device is mobile.

In one embodiment of the invention, agent 302 may operate in conjunction with separate anti-virus or other security software. For example, the agent may activate anti-virus software to examine a file downloaded by the browser or the agent.

Data privacy/security 312 may ensure that personal or private information of a user is protected adequately. For example, it may ensure that all temporary files of a particular application are deleted after the application closes, especially if such files may store such information. Because rules enforced by data privacy/security module 312 are intended to protect users' privacy, a privacy/security rule may override a rule enforced by record retention/expiration module 304.

Data privacy/security rules may be inherently related to particular locales (e.g., the United States, Europe), and therefore may include support tailored to those locales.

End-user feedback/polling 314 allows client 300 to be polled for usage statistics, and/or may automatically provide such information as feedback to a central server.

Web 2.0 management 316 facilitates operation of agent 302 within a web 2.0 or Ajax environment. Because a browser policy is applied locally by agent 302, to locally stored objects, even though the policy is created centrally and applied to multiple client devices, embodiments of the invention can work well in either environment.

Application deployment/versioning 318 coordinates installation of executable code on client 300 by interacting with a central server. For example, this module may ensure that a desired version of a particular browser or browser extension is used on the device. It may also be used for installing, updating or replacing agent 302.

Bookmark/favorites management 320 facilitates management of users' bookmarks and/or favorites. For example, this module may ensure that particular bookmarks/favorites are always included in users' lists, and may load pre-defined lists to new devices when they are added to the organization's network.

The client architecture of FIG. 3 facilitates non-real-time operation of a client agent to apply a central browser policy to manipulate persistent browser objects on the client. In an alternative embodiment of the invention, an agent may be configured as a browser extension or plug-in, to operate in real-time as the browser executes, and/or the agent may be configured to operate in real-time on the file system, in conjunction with a browser extension or plug-in.

Figure 4:
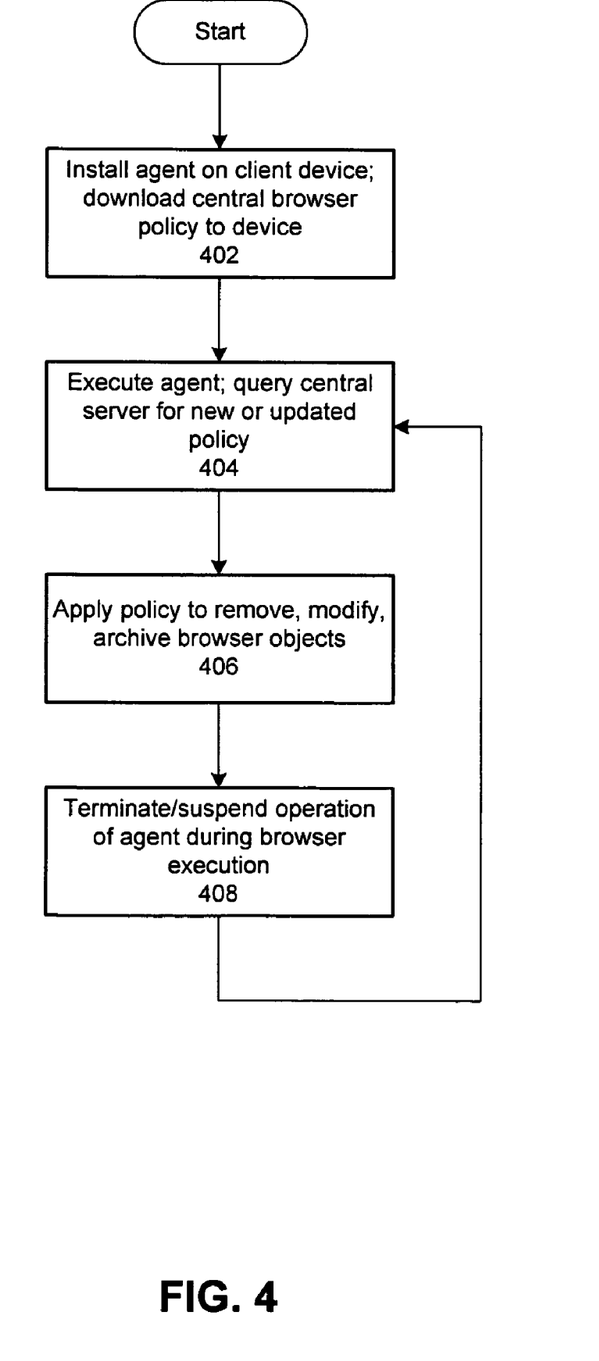
FIG. 4 is a flowchart illustrating one method of centrally managing browser objects, in accordance with an embodiment of the invention.

FIG. 4 is a flowchart demonstrating implementation of a central browser policy according to one embodiment of the invention. The illustrated method is configured for operation of an agent separate from a browser, to function in non-real-time with operation of the browser. An alternative embodiment may be derived from descriptions provided herein for operation of an agent that operates in real-time with browser operation (e.g., as a browser extension or plug-in, or as a file system agent acting in conjunction with a browser extension or plug-in).

In operation 402, an agent is installed on a client device (e.g., mobile telephone, PDA, laptop computer, workstation). During installation, a unique identity is assigned to the agent, and possibly to each browser instance configured for operation on the client.

In operation 404, the agent is executed as part of the initialization of the client device (e.g., the boot process), as an initial post-installation execution, in response to termination of a browser process, or at some other time. In this embodiment of the invention, each time the agent executes, it queries a central server (if the client is connected to the network hosting the central server) for any applicable new/updated central browser policies. Because the central server can uniquely identify the request, associate it with the client and identify the client's configuration (e.g., type(s) of operating system, type(s) of browsers, local filesystem or file structure), the central server can determine which policies the agent should have. Applicable new/updated policies are downloaded to the client.

In operation 406, the agent begins applying the central browser policy or policies that apply to the browser(s) that operate on the client. The agent may, however, only apply policies for browsers that are not currently executing.

As described above, during application of a policy, the agent may search for new browser objects (e.g., objects created since the last execution of the agent), modified objects, removal of objects, downloaded data, etc. In general, the agent may search the client's filesystem (or at least the file/directory structure a local browser instance is configured to use) for any changes that a browser instance may have made. Browser extensions and/or plug-ins may enforce policies based on objects existing in memory and on the file system (e.g., for real-time enforcement).

As the agent identifies actions taken by a browser, it may invoke various modules/functionality to take appropriate action: delete or block an object, archive an object on a central server, create an object (e.g., by copying it from a central server), modify an object (e.g., to remove personal or organizational information), send browser usage statistics to a central server, and so on.

In an alternative implementation, instead of scanning a filesystem for changes and then initiating appropriate action in response to detected changes, an agent may apply a list of rules or checks. For example, individual rules may instruct the agent to look for a specific object in a specific file/directory, and take some action if it is found (e.g., delete, archive, modify).

In operation 408, the agent terminates or suspends execution. This may occur because the agent has fully implemented the applicable policy or policies, because a browser that is covered by the policy being applied has resumed execution, because the client is shutting down, or for some other reason.

In particular, if the browser begins execution, the agent may hibernate or terminate until the browser terminates or becomes quiescent for some period of time. This may help avoid any negative impact on browser performance that may result from the agent executing at the same time. In one alternative embodiment, however, the agent may continue to function even while a browser is active, in order to share responsibility for policy enforcement between the agent and the browser extension or plug-in for example.

When the agent can resume execution (e.g., when an active browser terminates) after operation 408, the illustrated method returns to operation 404. Even when not actively applying a policy, however, an agent process may remain active and may therefore respond to polls or alerts from a central server (e.g., by returning browser usage statistics that it had gathered during its latest operation, by acknowledging new instructions or an updated policy to be applied the next time it operates).

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method comprising:
   transmitting a request for a central browser policy at an agent on a client computing device having a browser to a central server that stores central browser policies, wherein the request includes an identifier assigned to the browser at installation of the agent, wherein the identifier uniquely identifies an instance of the browser;
   receiving the central browser policy from the central server, wherein the central browser policy is determined based on the identifier in the request;
   executing the agent to apply the received central browser policy to the client computing device;
   in response to a first notification from the browser that the browser has begun execution on the client computing device, suspending application of the central browser policy; and
   in response to a second notification from the browser that the browser has ceased execution, resuming application of the central browser policy by the agent;
   wherein the central browser policy is applied to one or more other client computing devices that are managed by the central server.

2. The method of claim 1, further comprising:
   monitoring navigation by the browser by examining persistent browser objects manipulated by the browser; and
   transmitting statistics regarding the navigation to the central server.

3. The method of claim 1, wherein the agent is configured to delete one or more files saved on the client computing device during execution of the browser.

4. The method of claim 1, wherein the agent is configured to save on the client computing device one or more browser objects received from the central server.

5. The method of claim 1, wherein the agent is configured to archive one or more files saved by the browser, on storage remote from the client computing device.

6. The method of claim 1, wherein the agent is configured to undo manipulation of a browser object performed by the browser.

7. The method of claim 1, wherein the central browser policy is configured to be simultaneously applied by other instances of the agent executing on other client computing devices.

8. The method of claim 1, wherein the central browser policy applies to multiple types of browsers.

9. A method comprising:
   transmitting a request for a central browser policy at an agent on a client computing device having a browser to a central server that stores central browser policies, wherein the request includes an identifier assigned to the browser at installation of the agent, wherein the identifier uniquely identifies an instance of the browser;
   when a browser commences execution on the client computing device, executing the agent to monitor manipulation of browser objects by the browser,
   wherein the agent blocks creation of a first object by the browser if the first object violates a central browser policy which is determined based on the identifier in the request,
   wherein the agent creates a second object on the client computing device if the second object is required by the central browser policy and is not created by the browser;
   wherein the agent reports usage of the browser to the central server; and
   wherein the central browser policy is applied on the client computing device and one or more other client computing devices that are managed by the central server.

10. The method of claim 9, wherein the agent is further configured to:
    alert a user of the client computing device if the user attempts to navigate the browser to a site disfavored by the central browser policy.

11. The method of claim 9, wherein the agent is further configured to:
    alert an administrator of the central browser policy if the user attempts to navigate the browser to a site disfavored by the central browser policy.

12. The method of claim 9, wherein the agent is further configured to:
    archive one or more objects from the client computing device on the central server.

13. A method comprising:
    storing central browser policies on a central server accessible to one or more client computing devices;
    receiving a request from an agent on a client computer device having a browser, wherein the request includes an identifier assigned to the browser at installation of the agent, wherein the identifier uniquely identifies an instance of the browser;
    transmitting a central browser policy to the client computing device for application by the requesting agent, wherein the central browser policy is determined based on the identifier in the request;
    during application of the central browser policy by the agent:
      receiving from the client computing device archive copies of a first set of browser objects identified in the central browser policy; and
      transmitting data to the agent for storage on the client computing device as a second set of browser objects identified in the central browser policy as required browser objects.

14. The method of claim 13, further comprising during application of the central browser policy by the agents:
    receiving statistics regarding behavior of browsers executing on the client computing devices.

15. The method of claim 13, further comprising during application of the central browser policy by the agents:
    polling the agents for statistics regarding behavior of browsers executing on the client computing devices.

16. An apparatus comprising:
    a repository configured to store:
      one or more central browser policies configured for simultaneous application on the multiple client computing devices;
      a set of browser objects to be copied to the multiple client computing devices before browsers executing on the devices are navigated to sites associated with the objects; and
      a set of archived browser objects on the multiple client computing devices; and an application server comprising:

a management console for facilitating configuration of a central browser policy by an administrator;

an identity manager configured to assign an identifier to a browser at installation of an agent on each of the multiple computing devices to apply the central browser policy, wherein the identifier uniquely identifies an instance of the browser, and wherein the central browser policy is determined based on the identifier in a request received from the agent;

an interface configured to facilitate integration of the central browser policy with an application executing external to the apparatus and the multiple computing devices; and a daemon configured to receive a connection from the agent operating on client computing device and interface between the agent and the repository based on the unique identifier.

17. A client computing device, comprising:

a browser;

a browser policy configured at a central server for simultaneous implementation on multiple devices including the client computing device; and an agent configured to implement the browser policy, wherein the agent comprises:

a record retention module configured to:

delete a first browser object manipulated by the browser that violates the browser policy; and copy to the client computing device from the central server a second browser object required by the browser policy, before the browser is navigated to a site associated with the second browser object;

a browser usage auditing module configured to report navigation activity of the browser to the central server; and a malware protection module configured to facilitate protection of the client computing device from malware in accordance with the browser policy;

wherein the browser is assigned an identifier at installation of the agent, wherein the identifier uniquely identifies an instance of the browser, and wherein the central browser policy is determined based on the identifier in a request transmitted from the agent to the central server.

18. The client computing device of claim 17, wherein the agent is configured to execute and apply the browser policy only when the browser is inactive.

19. The client computing device of claim 17, wherein the agent is configured to execute and apply the browser policy during execution of the browser.

* * * * *

UNITED STATES PATENT AND TRADEMARK OFFICE
CERTIFICATE OF CORRECTION

PATENT NO. : 8,220,037 B2
APPLICATION NO. : 11/637518
DATED : July 10, 2012
INVENTOR(S) : Snyder et al.

Page 1 of 1

It is certified that error appears in the above-identified patent and that said Letters Patent is hereby corrected as shown below:

In column 4, line 44, delete ""action-types"" and insert -- "action types" --, therefor.

Signed and Sealed this
Second Day of October, 2012

David J. Kappos
*Director of the United States Patent and Trademark Office*